US012209412B2

(12) United States Patent
Partridge et al.

(10) Patent No.: US 12,209,412 B2
(45) Date of Patent: *Jan. 28, 2025

(54) CEILING PANEL

(71) Applicant: Orangebox Limited, Cardiff (GB)

(72) Inventors: Mark Partridge, Huddersfield (GB); Richard Drew, Huddersfield (GB)

(73) Assignee: Orangebox Limited, Cardiff (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,983

(22) Filed: Apr. 20, 2021

(65) Prior Publication Data

US 2021/0310243 A1 Oct. 7, 2021

Related U.S. Application Data

(63) Continuation of application No. 16/875,696, filed on May 15, 2020, now Pat. No. 11,008,754, which is a (Continued)

(30) Foreign Application Priority Data

Feb. 20, 2013 (GB) ..................................... 1302991

(51) Int. Cl.
*E04F 10/10* (2006.01)
*A62C 2/24* (2006.01)
(Continued)

(52) U.S. Cl.
CPC .............. *E04B 9/003* (2013.01); *A62C 2/241* (2013.01); *E04B 1/343* (2013.01); *E04B 1/82* (2013.01);
(Continued)

(58) Field of Classification Search
CPC . E04B 9/003; E04B 1/343; E04B 1/82; E04B 1/8218; E04B 1/941; E04B 2/74;
(Continued)

(56) References Cited

U.S. PATENT DOCUMENTS 2,857,634 A * 10/1958 Garbade ................. E04B 7/163 49/82.1
3,011,225 A 12/1961 Alfred
(Continued)

FOREIGN PATENT DOCUMENTS

CA 2971702 A1 6/2016
CN 2492632 Y 5/2002
(Continued)

OTHER PUBLICATIONS

International Search Report and Written Opinion mailed Mar. 7, 2014 in connection with International Application No. PCT/GB2013/053158.

(Continued)

*Primary Examiner* — Beth A Stephan
(74) *Attorney, Agent, or Firm* — Wolf, Greenfield & Sacks, P.C.

(57) ABSTRACT

There is provided a ceiling panel for a pod room. The ceiling panel comprises one or more cover components movable between an open configuration and a closed configuration; and an actuation mechanism configured to move the one or more cover components from the closed configuration to the open configuration in response to a trigger. The ceiling panel may provide a specified percentage open area in the open configuration. The ceiling panel may be adapted to acoustically insulate the pod room in the closed configuration.

20 Claims, 15 Drawing Sheets

Related U.S. Application Data continuation of application No. 15/870,369, filed on Jan. 12, 2018, now abandoned, which is a continuation of application No. 14/769,329, filed as application No. PCT/GB2013/053158 on Nov. 29, 2013, now Pat. No. 9,903,114.

(51) Int. Cl.

| | |
|---|---|
| ***E04B 1/343*** | (2006.01) |
| ***E04B 1/82*** | (2006.01) |
| ***E04B 1/94*** | (2006.01) |
| ***E04B 2/74*** | (2006.01) |
| ***E04B 7/16*** | (2006.01) |
| ***E04B 9/00*** | (2006.01) |
| ***E04B 9/02*** | (2006.01) |
| ***E04F 10/02*** | (2006.01) |
| ***E04H 1/12*** | (2006.01) |

(52) U.S. Cl.
CPC ............ *E04B 1/8218* (2013.01); *E04B 1/941* (2013.01); *E04B 2/74* (2013.01); *E04B 7/163* (2013.01); *E04B 9/001* (2013.01); *E04B 9/02* (2013.01); *E04F 10/02* (2013.01); *E04F 10/10* (2013.01); *E04H 1/125* (2013.01)

(58) Field of Classification Search
CPC .. E04B 7/163; E04B 9/001; E04B 9/02; E04F 10/02; E04F 10/10; E04H 1/125; A62C 2/241
See application file for complete search history.

(56) References Cited

U.S. PATENT DOCUMENTS

| | | | | |
|---|---|---|---|---|
| 3,123,189 A | | 3/1964 | Wiley | |
| 3,254,451 A | | 6/1966 | Wills et al. | |
| 3,766,691 A | * | 10/1973 | Ray | E04B 7/166 52/71 |
| 4,099,346 A | | 7/1978 | Isono | |
| 4,128,307 A | | 12/1978 | Badertscher et al. | |
| 4,276,954 A | | 7/1981 | Romano | |
| 4,313,650 A | * | 2/1982 | Ward | A01G 9/222 49/77.1 |
| 4,527,355 A | | 7/1985 | Numakami et al. | |
| 4,884,615 A | | 12/1989 | Hsu | |
| 4,926,599 A | | 5/1990 | Scholz | |
| 5,306,210 A | | 4/1994 | Smit | |
| 5,433,259 A | | 7/1995 | Faludy | |
| 5,732,507 A | | 3/1998 | Edwards | |
| 5,733,036 A | | 5/1998 | Montgomery | |
| 5,839,233 A | | 11/1998 | Smit | |
| 5,862,633 A | | 1/1999 | Van Ells | |
| 5,941,021 A | | 8/1999 | Valls, Jr. et al. | |
| 5,996,672 A | | 12/1999 | Kotin | |
| 6,205,716 B1 | | 3/2001 | Peltz | |
| 6,324,792 B1 | | 12/2001 | DeGarie | |
| 7,086,444 B2 | | 8/2006 | Nien | |
| 7,335,096 B2 | | 2/2008 | Perez et al. | |
| 7,503,371 B2 | | 3/2009 | Lee | |
| 7,658,199 B2 | | 2/2010 | Ayers et al. | |
| 7,913,710 B2 | | 3/2011 | Bougioukos | |
| 8,413,389 B2 | | 4/2013 | Frigerio | |
| 8,820,003 B2 | | 9/2014 | DeLorean | |
| 9,175,511 B2 | | 11/2015 | Whytlaw | |
| 9,422,715 B1 | | 8/2016 | Selzer | |
| 9,650,786 B2 | | 5/2017 | Weaver et al. | |
| 9,903,114 B2 | | 2/2018 | Partridge et al. | |
| 10,094,122 B1 | | 10/2018 | Akbulut | |
| 10,560,050 B2 | | 2/2020 | Raghunathan | |
| 11,008,754 B2 | | 5/2021 | Partridge et al. | |
| 2002/0189170 A1 | | 12/2002 | Reuschel et al. | |
| 2004/0074157 A1 | | 4/2004 | Chazal | |
| 2007/0068106 A1 | | 3/2007 | Mangano | |
| 2008/0041969 A1 | | 2/2008 | Nathan | |
| 2011/0225913 A1 | | 9/2011 | Frigerio | |
| 2013/0199736 A1 | | 8/2013 | Ro | |
| 2013/0291438 A1 | | 11/2013 | Selzer | |
| 2014/0130988 A1 | | 5/2014 | Frigerio | |
| 2014/0165482 A1 | | 6/2014 | Tandler | |
| 2014/0175240 A1 | | 6/2014 | Selzer | |
| 2015/0092400 A1 | | 4/2015 | Vincenzi | |
| 2015/0376901 A1 | | 12/2015 | Partridge et al. | |
| 2016/0115688 A1 | | 4/2016 | Weaver et al. | |
| 2018/0202156 A1 | | 7/2018 | Partridge et al. | |
| 2018/0313142 A1 | | 11/2018 | Gharabegian | |
| 2019/0338528 A1 | | 11/2019 | Torman et al. | |
| 2020/0277784 A1 | | 9/2020 | Partridge et al. | |

FOREIGN PATENT DOCUMENTS

| | | |
|---|---|---|
| CN | 201065593 Y | 5/2008 |
| DE | 33 37 436 A1 | 5/1984 |
| DE | 4244012 A1 | 6/1994 |
| DE | 10 2007 023007 B3 | 10/2008 |
| DE | 202009012206 U1 | 12/2009 |
| EP | 0 244 161 A1 | 11/1987 |
| EP | 0 244 191 A1 | 11/1987 |
| EP | 0 324 256 A2 | 7/1989 |
| EP | 0 373 047 A1 | 6/1990 |
| EP | 0 469 695 A1 | 2/1992 |
| EP | 2 159 339 A2 | 3/2010 |
| EP | 3 015 618 A1 | 5/2016 |
| FR | 2 511 128 A1 | 2/1983 |
| FR | 2676079 A1 | 11/1992 |
| FR | 3 042 802 A1 | 4/2017 |
| GB | 191413675 A | 7/1915 |
| GB | 2 045 917 A | 11/1980 |
| GB | 2 321 489 A | 7/1998 |
| GB | 2 442 141 A | 3/2008 |
| GB | 2 489 194 A | 9/2012 |
| JP | 2009185490 A | 8/2009 |
| JP | 2010-121316 A | 6/2010 |
| KR | 101782370 B1 | 9/2017 |
| KR | 2017-0142665 A | 12/2017 |
| WO | WO 95/12738 A1 | 5/1995 |
| WO | WO 2017/199105 A1 | 11/2017 |
| WO | WO 2020/074451 A1 | 4/2020 |

OTHER PUBLICATIONS

International Preliminary Report on Patentability mailed Sep. 3, 2015 in connection with International Application No. PCT/GB2013/053158.
Extended European Search Report dated Feb. 14, 2018 in connection with European Application No. 17197135.1.
European Communication dated Mar. 21, 2019 in connection with European Application No. 17197135.1.

* cited by examiner

FIG. 7B
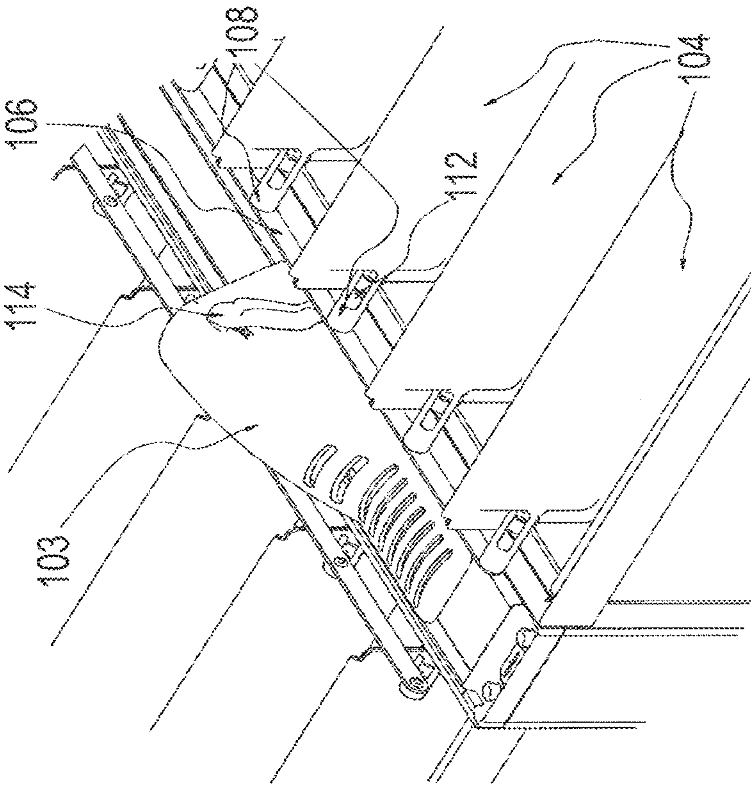
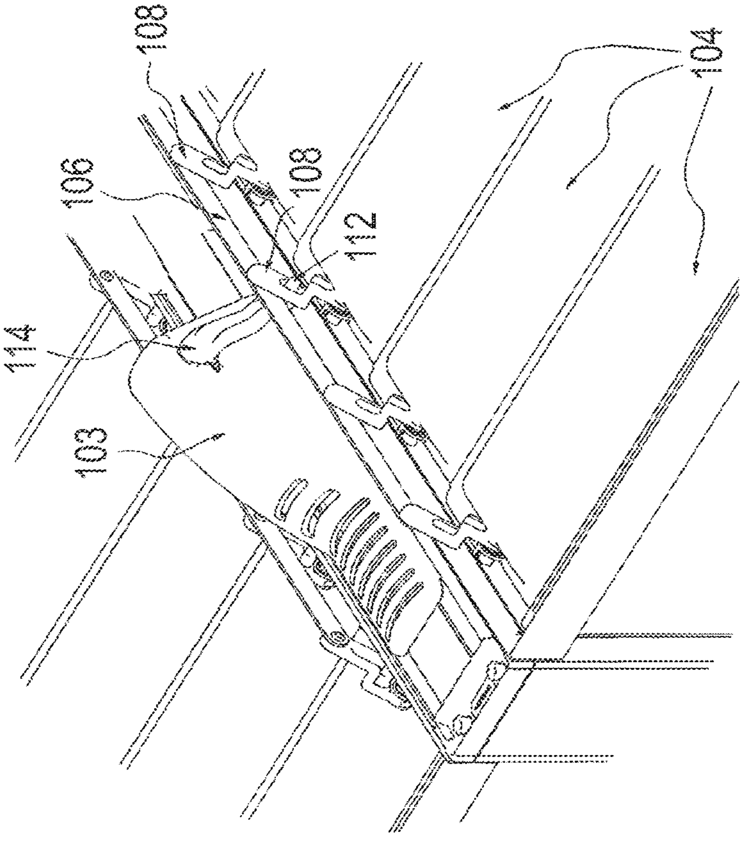
FIG. 7A

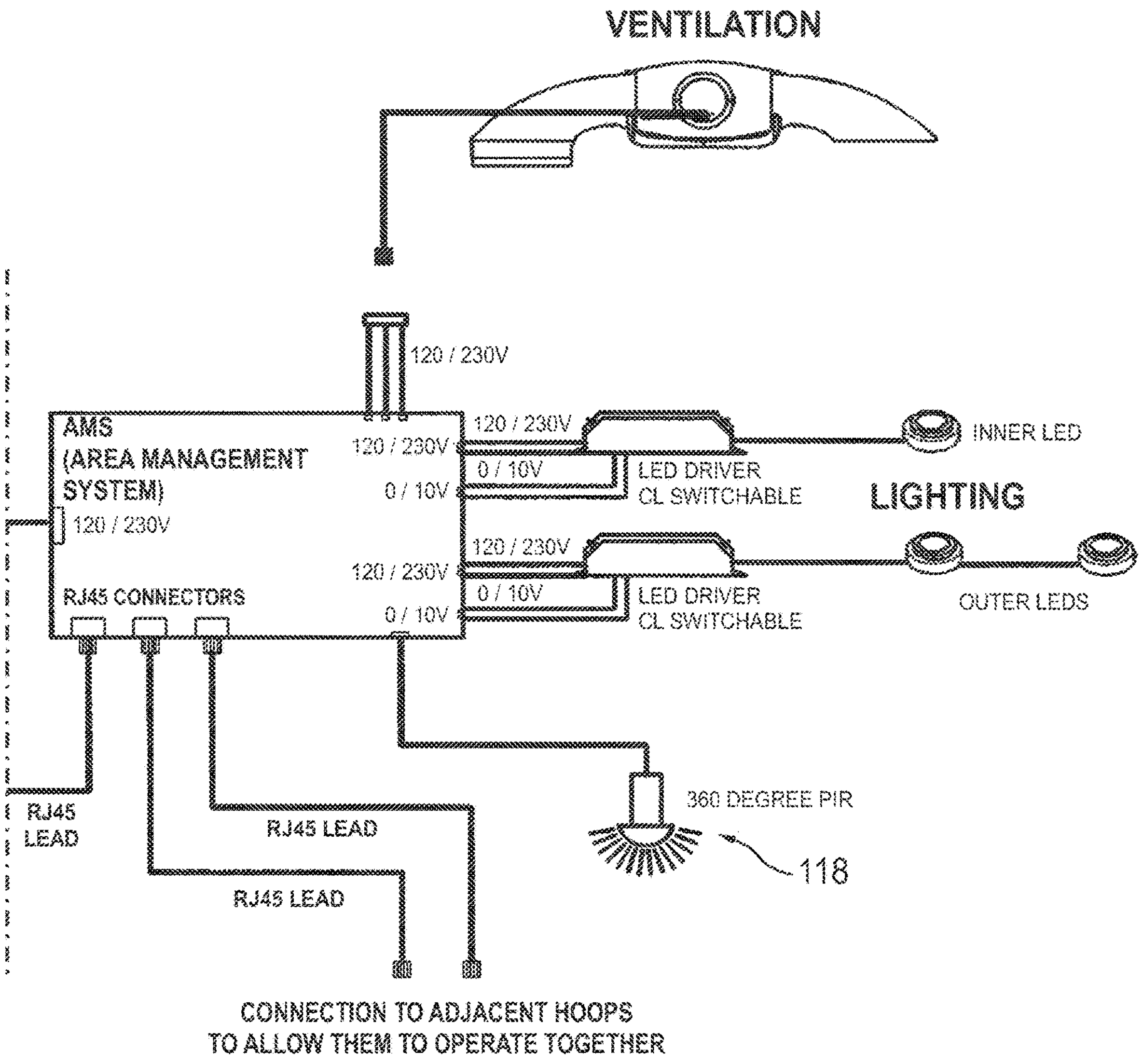
FIG. 9(CONTD.)

CEILING PANEL

CROSS-REFERENCE TO RELATED APPLICATIONS

This application is a Continuation of U.S. application Ser. No. 16/875,696, filed May 15, 2020, which is a Continuation of U.S. application Ser. No. 15/870,369, filed Jan. 12, 2018, which is a Continuation of U.S. application Ser. No. 14/769,329, filed Aug. 20, 2015, which is a national stage filing under 35 U.S.C. § 371 of International Application Serial No. PCT/GB2013/053158, filed Nov. 29, 2013, which claims priority to United Kingdom Application Serial No. 1302991.3, filed Feb. 20, 2013. The entire contents of these applications are incorporated herein by reference.

The invention relates to a ceiling panel for a pod room, and a ceiling system incorporating one or more ceiling panels.

BACKGROUND

Fixed partition rooms require project planning, coordination with building trades, building regulation approval, and permanent connections to the infrastructure of the building in which the fixed partition rooms are installed, all of which incur cost, over the initial build cost, along with disruption and landfill waste when there is a need to reconfigure.

Pod rooms on the other hand can simply be unpacked, assembled and plugged in, and may offer a guaranteed acoustic performance. Assembly may require just one tool with a large proportion of the system able to be assembled by hand.

SUMMARY

According to a first aspect of the present invention, there is provided a ceiling panel for a pod room, the ceiling panel comprising one or more cover components movable between an open configuration and a closed configuration and whereby the one or more cover components are adapted to acoustically insulate the pod in the closed configuration. The cover components preferably provide a fractional sound absorption coefficient of at least 0.2, more preferably at least 0.4 and most preferably at least 0.6.

According to a second aspect of the present invention, there is further provided a ceiling panel for a pod room, the ceiling panel comprising one or more cover components movable between an open configuration and a closed configuration and whereby the one or more cover components in the open configuration produce at least a specified percentage open area.

The specified percentage open area may be at least a 65.0% open area, preferably at least a 67.0% open area, more preferably at least a 70.0% open area and most preferably a 72% open area.

According to a combination of the first and second aspects of the present invention, there is provided a ceiling panel for a pod room, the ceiling panel comprising one or more cover components movable between an open configuration and a closed configuration and whereby the one or more cover components are adapted to acoustically insulate the pod in the closed configuration and whereby the one or more cover components in the open configuration produce at least a specified percentage open area.

The specified percentage open area may be at least a 65.0% open area, preferably at least a 67.0% open area, more preferably at least a 70.0% open area and most preferably a 72% open area.

According to a third aspect of the present invention, there is provided a ceiling panel for a pod room, the ceiling panel comprising one or more cover components movable between an open configuration and a closed configuration; and an actuation mechanism configured to move the one or more cover components from the closed configuration to the open configuration in response to a trigger.

The actuation mechanism may be configured to bias one or more of the cover components towards the open configuration, and further configured in a first state to hold the one or more cover components in the closed configuration against the bias, and in a second state to allow the one or more cover components to move towards the open configuration under the bias, the actuation mechanism being configured to move from the first state to the second state in response to the trigger.

The first state may be a powered state and the second state may be an unpowered state.

The trigger may comprise a power cut to the actuation mechanism.

The "ceiling panel" may comprise a unit or section which is to define part or all of a ceiling or roof of a pod room. In one example, the ceiling panel comprises an opening or openable ceiling panel. The ceiling panel may constitute one of a number of ceiling panels which together form a ceiling or ceiling system, with at least one of the ceiling panels being openable. It may be the case that all of the ceiling panels have to be openable.

By "pod room" is meant an assemblable structure, building, partition or installation, which may be temporary, for use within a larger structure or building, to serve as a self-contained room, such as a meeting room.

The one or more cover components may include any element serving to cover or enclose the pod room substantially to prevent air and/or light from passing through and also create a level of acoustic insulation. The one or more cover components may comprise a plurality of movable segments.

In one example, the one or more cover components may comprise a plurality of pivotable louvres. By "louvres" are meant slats which are fixed at intervals relative to one another. The louvres being pivotable between contacting positions in which the louvres contact one another to define the closed configuration, and non-contacting positions which define the open configuration.

The louvres may have an overlapping portion such as a flange in which a louvre overlaps with at least one neighbouring louvre to define the closed configuration in order to improve the seal. This overlap may be between 20 mm and 60 mm and will preferably be between 30 mm and 50 mm, more preferably between 35 mm and 45 mm and most preferably about 41 mm. The overlapping portion or flange may further comprise a nib to improve the seal. The nib may directly abut the overlapping portion or flange of a neighbouring louvre. The nib may increase the contact area between adjacent louvres or help to define a sound insulation cavity to improve the acoustic seal.

In one further example, the cover components or louvres comprise a composite of a higher density material and a lower density material. The higher density material may form a 'core' and the lower density material may form a 'cladding' which surrounds at least a portion of the higher density material. The core may have a substantially planar shape. The cladding may extend around the substantially planar core. The cladding may further comprise a flange. The flange may at least partially overlap with at least one flange on a neighbouring louvre in order to improve the seal and reduce acoustic leakage at the join. The flange may further include a nib which protrudes in a direction substantially perpendicular to the flange. The flanges and the nibs of two adjacent louvres may define an insulating cavity which further improves the seal in the closed configuration. In further examples, the higher density material may have a density of at least 500 kg/m$^3$ and preferably at least 700 kg/m$^3$. At least one of the higher density material and the lower density material ideally comprises a sound insulating material. At least one of the higher density material and the lower density material ideally comprises a sound absorbent material. The absorbent material may have a fractional absorption coefficient of at least 0.2, preferably at least 0.4 and more preferably at least 0.6. The absorbent material may be between 5 mm and 25 mm in thickness, preferably between 10 mm and 20 mm in thickness and more preferably about 15 mm in thickness.

By the term "fractional absorption coefficient" (also known as the "fractional attenuation coefficient") is meant the extent to which the intensity of an energy beam (such as an acoustic wave) is reduced as it passes through one or more materials. The fractional absorption coefficient is a number between 0 and 1 inclusive. A fractional absorption coefficient of 0 represents no absorption or attenuation of an energy beam; a fractional absorption coefficient of 1 represents total absorption or attenuation of an energy beam.

In a further example, the louvres may have a louvre width of between 20 mm and 500 mm, preferably between 100 mm and 400 mm, more preferably between 200 mm and 300 mm and, in a specific embodiment, about 248 mm.

In a further example, the louvres may have a louvre pitch of between 30 mm and 500 mm, preferably between 100 mm and 400 mm, more preferably between 150 mm and 250 mm and, in a specific embodiment, about 207.5 mm.

By the term "louvre pitch" is meant the fixed interval between the centres of two adjacent louvres.

In a further example, the louvres may have a louvre thickness of between 6 mm and 70 mm, preferably between 15 mm and 60 mm, more preferably between 25 mm and 50 mm and, in a specific embodiment, about 40 mm.

The ceiling panel may further comprise a connection element pivotably connected to each louvre to effect synchronous movement of the louvres.

In another example, the one or more cover components may be interconnected to form a concertina, the concertina being movable between a collapsed position which defines the open configuration and an extended position which defines the closed configuration. By "concertina" is meant an arrangement which compresses or collapses into folds.

In a further example, the one or more cover components may form a tambour cover which is movable between a stowed position which defines the open configuration and an extended position which defines the closed configuration. By "tambour cover" is meant a cover of fabric or flexible material that is pulled taut, or an arrangement of interconnected segments which is capable of moving into a curved or rolled stowed configuration.

A further example comprises connected louvres, counterweighted or spring loaded at one side to create an open bias (urging the louvres towards a vertical orientation) but held closed by means of a mechanical fusible link holding the louvres in their closed position until the fusible link breaks once the temperature has reached a predetermined threshold.

The open configuration may comprise any arrangement of the one or more cover components which substantially permits light and/or air to pass through the ceiling panel, which in the closed configuration may be any arrangement which substantially prevents the same. In one example, the open configuration may create at least 70% open area in the ceiling panel. In the closed configuration, the cover components may be designed to overlap the edges of the ceiling panel to generate an acoustic seal and/or minimise any gaps.

The ceiling panel may comprise any mechanism which is arranged to bias the one or more cover components without a requirement for electricity or any other power source. In one example, the ceiling panel may comprise a spring release configured to bias the one or more cover components towards the open configuration. By "spring release" is meant any arrangement which uses stored elastic energy to provide the biasing effect, and in which a resilient element may be releasably elastically deformed so as to store such energy. In another example, the actuation mechanism may comprise at least one counterweight configured to bias the one or more cover components towards the open configuration.

Furthermore, the actuation mechanism may comprise a mechanism which is operable to hold the cover components in the closed configuration against the bias. The actuation mechanism may be powered or powerable by, for example an electromechanical, hydraulic or pneumatic actuator, which may operate in a linear or rotary fashion. In one example, the actuation mechanism comprises an electromechanical actuator configured in a powered state to hold the one or more cover components in the closed configuration against the bias, and in an unpowered state to allow the one or more cover components to move towards the open configuration under the bias. The terms "powered state" and "unpowered state" may relate to the actuation mechanism being provided with or deprived of a source of energy or power, such as an electrical power source, or in other examples a pneumatic or hydraulic power source. Alternatively, the actuation mechanism may operate without the need for power. In one example, the actuation mechanism may comprise a fusible link configured in an intact state to hold the one or more cover components in the closed configuration against the bias, and in a fused state to allow the one or more cover components to move towards the open configuration under the bias, wherein the fusible link is configured to fuse upon reaching a predetermined threshold temperature.

In another aspect of the present invention, there may be provided a ceiling panel comprising one or more cover components as described herein whereby the one or more cover components are adapted to acoustically insulate the pod in the closed configuration and the ceiling panel further comprises an actuation mechanism configured to move the one or more cover components from the closed configuration to the open configuration in response to a trigger.

In yet another aspect of the present invention, there may be provided a ceiling panel comprising one or more cover components as described herein whereby the one or more cover components provide a specified percentage open area in the open configuration and the ceiling panel further comprises an actuation mechanism configured to move the one or more cover components from the closed configuration to the open configuration in response to a trigger.

In yet a further aspect of the present invention, there may be provided a ceiling panel comprising one or more cover components as described herein whereby the one or more cover components provide a specified percentage open area in the open configuration, whereby the one or more cover components are adapted to acoustically insulate the pod in the closed configuration and the ceiling panel further comprises an actuation mechanism configured to move the one or more cover components from the closed configuration to the open configuration in response to a trigger.

There may be provided a ceiling system comprising one or more ceiling panels as described or claimed herein.

The ceiling system may comprise a detection unit configured to provide the trigger to the actuation mechanism in response to the detection of a predetermined condition.

The detection unit may comprise a smoke detector configured to respond to the detection of smoke. Additionally or alternatively, the detection unit may comprise a movement detector configured to respond to the detection of an absence of movement in the pod room. The movement detector may comprise a PIR (passive infrared sensor). Additionally or alternatively, the detection unit may comprise a heat detector configured to respond to the detection of a temperature within the pod room reaching a predetermined threshold. The heat detector may comprise a fusible link configured to fuse when responding to the detection of a temperature within the pod room reaching a predetermined threshold. All the above cut power to the said actuation mechanism when the temperature within the pod room reaches the predetermined threshold.

There may also be provided a pod room comprising a ceiling panel or ceiling system as described or claimed herein.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which:—

FIG. 38 shows the ceiling panel of FIG. 3A in an open configuration;

FIGS. 4A and 48 are side elevations of the ceiling panel of FIGS. 3A and 3B respectively in closed and open configurations:

FIGS. 7A and 7B show an actuation mechanism with the ceiling system of FIGS. 1-4 in open and closed configurations, respectively;

DETAILED DESCRIPTION

Figure 1B:
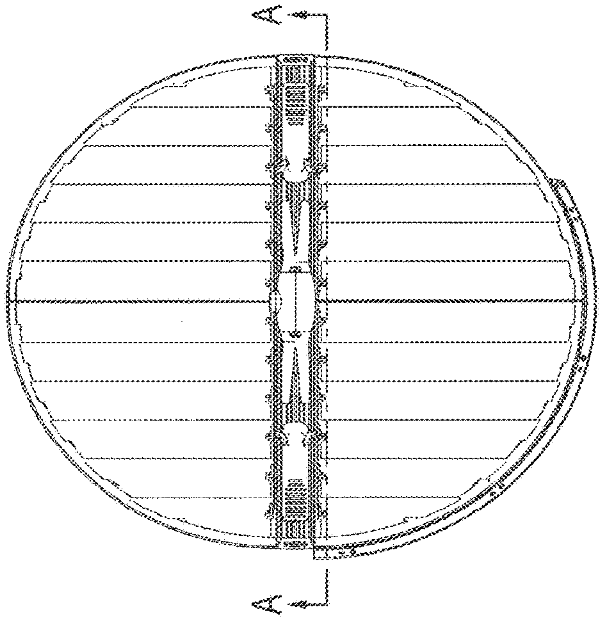
FIGS. 1A, 1B and 1C show a round pod room having a ceiling system in a closed configuration.
Figure 1C:
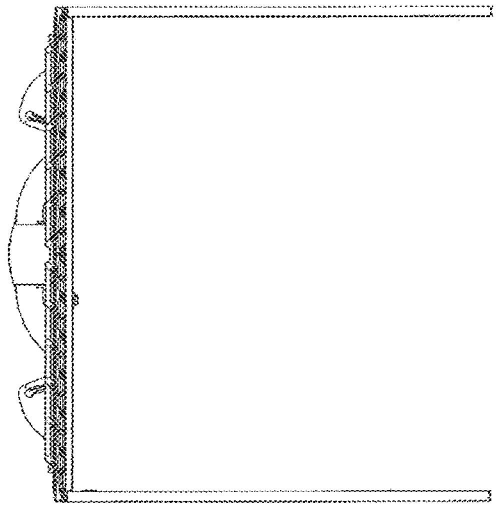
Figure 1A:
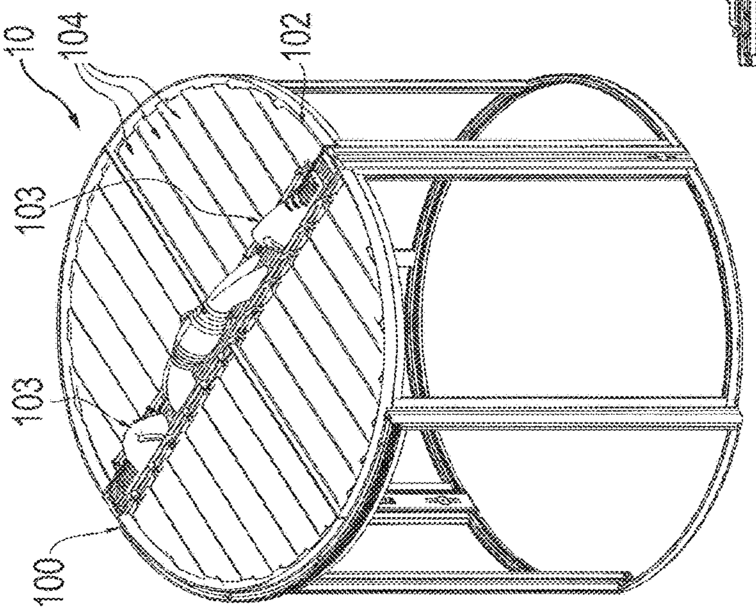
Figure 2B:
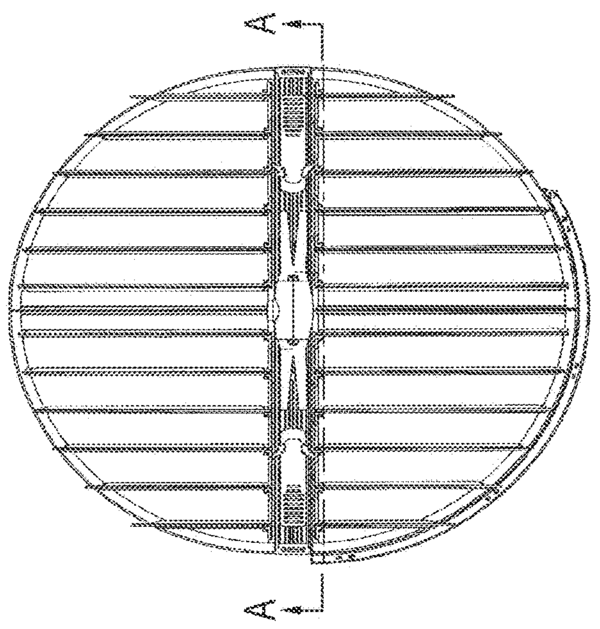
FIGS. 2A, 2B and 2C show the pod room of FIG. 1 with the ceiling system in an open configuration.
Figure 2C:
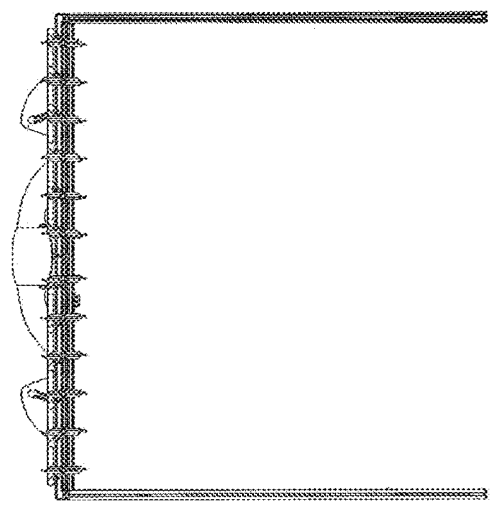
Figure 2A:
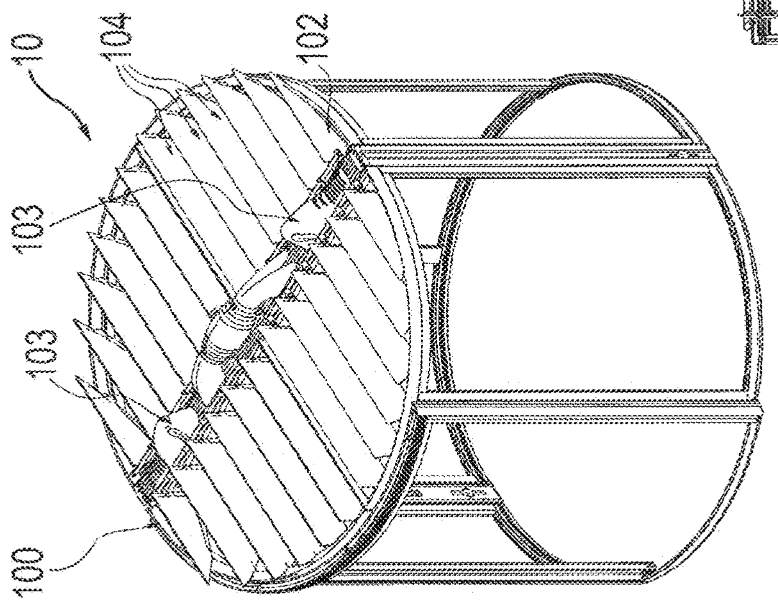

FIGS. 1A, 1B and 1C show a pod room 10 having a ceiling system 100 in a closed configuration, and FIGS. 2A, 2B and 2C show the pod room 10 with the ceiling system 100 in an open configuration. As shown in these figures, the pod room 10 is a round pod. The ceiling system 100 comprises a plurality of ceiling panels 102, each of which comprises one or more cover components 104 movable between an open configuration and a closed configuration.

The ceiling system 100 provides an opening roof system for fire suppression of standalone pod rooms 10. The ceiling system 100 may be activated in the event of a fire within the pod room 10, which may not be physically connected or extended to the ceiling of the environment or building in which the pod room 10 is installed.

The cover components 104 comprise a plurality of pivotable louvres 104, the louvres being pivotable between contacting positions in which the louvres overlay one another to define the closed configuration, as shown in FIGS. 1A, 1B and 1C, and non-contacting positions which define the open configuration, as shown in FIGS. 2A, 2B and 2C. In one implementation, the louvres 104 open through about 90 degrees until they reach a substantially vertical orientation in order to create at least 70% open area in the ceiling system.

The ceiling panel 102 comprises an actuation mechanism 103, which includes a spring release (not shown) configured to bias the cover components 104 towards the open configuration. The actuation mechanism 103 further comprises an electromechanical actuator (not shown) configured in a powered state to hold the cover components 104 in the closed configuration against the bias of the spring release, and in an unpowered state to allow the spring release to move the cover components 104 towards the open configuration.

Figure 3A:
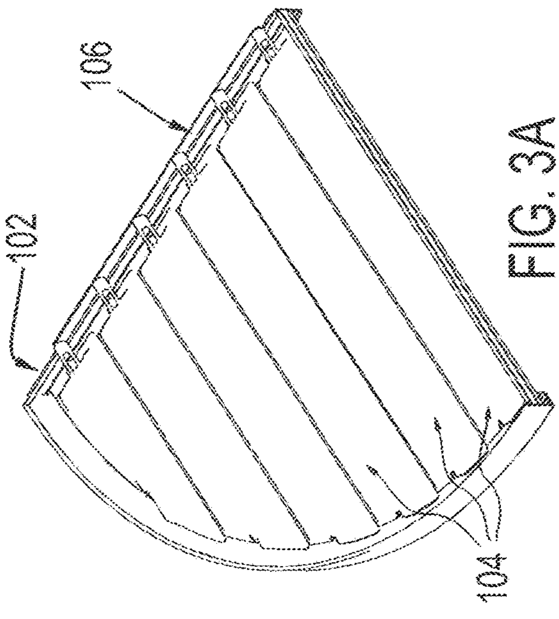
FIG. 3A shows a single ceiling panel of the ceiling system of FIGS. 1 and 2 in a closed configuration.
Figure 3B:
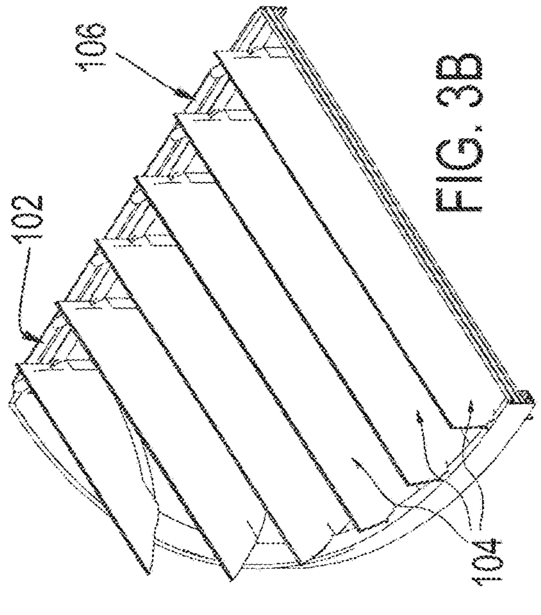

FIG. 3A shows a single ceiling panel 102 in a closed configuration, and FIG. 3B shows the ceiling panel 102 in an open configuration. As can be seen, the ceiling panel 102 comprises a connection element 106 pivotably connected to each louvre 104 to effect synchronous movement of the louvres 104.

Figure 4A:
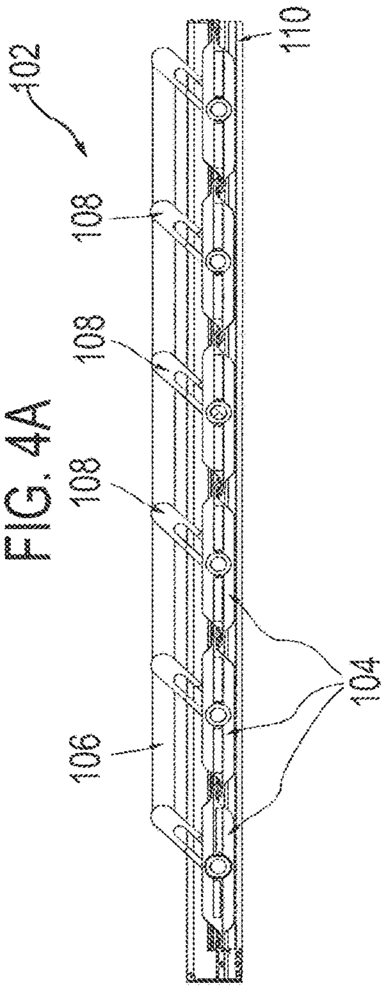
Figure 4B:
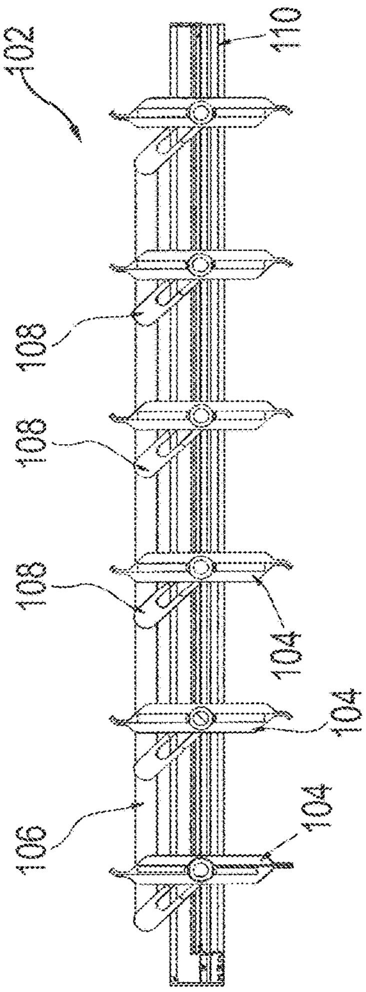

FIGS. 4A and 4B are side elevations of the ceiling panel 102 of FIGS. 3A and 3B respectively in closed and open configurations, showing the connection element 106 in more detail.

Each louvre 104 is connected by a single connection element 106 or bar 106. Each louvre 104 has a fixedly attached (e.g. cast or moulded) lever arm 108, one end of which is pivotably attached to the bar 106 and a second end of which is pivotably attached to a frame 110 of the ceiling panel 102. The spring release 103 and electromechanical actuator 105 are connected to one of the louvres 104 (in one example a first louvre 104) by means of a lever arm 108 and thereby to all of the other louvres 104 by means of the connection bar 106 interconnected to all the louvres 104.

Figure 5A:
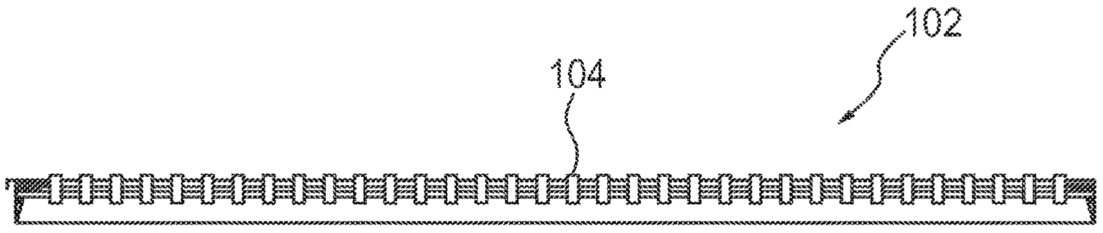
FIGS. 5A, 5B and SC are side elevations of a ceiling panel with the cover components in an open configuration, wherein the open configurations produce different specified percentage open areas.
Figure 5B:
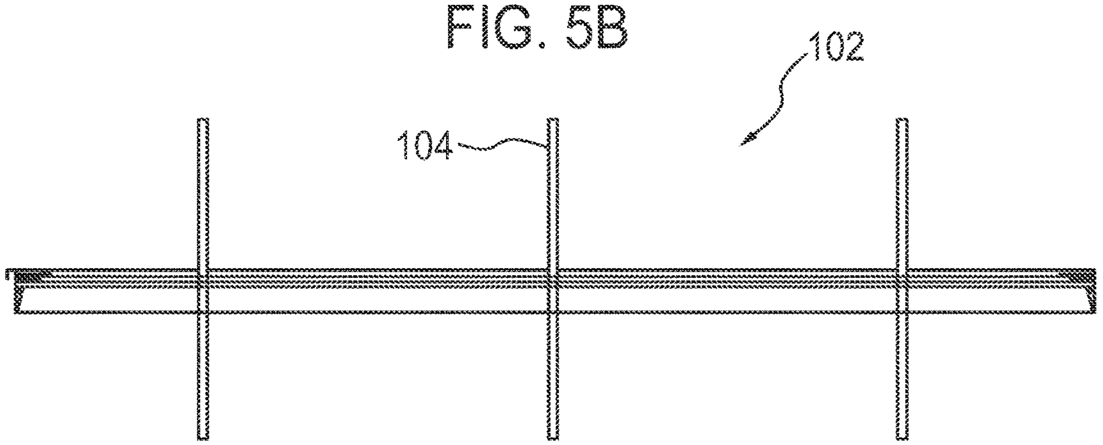
Figure 5C:
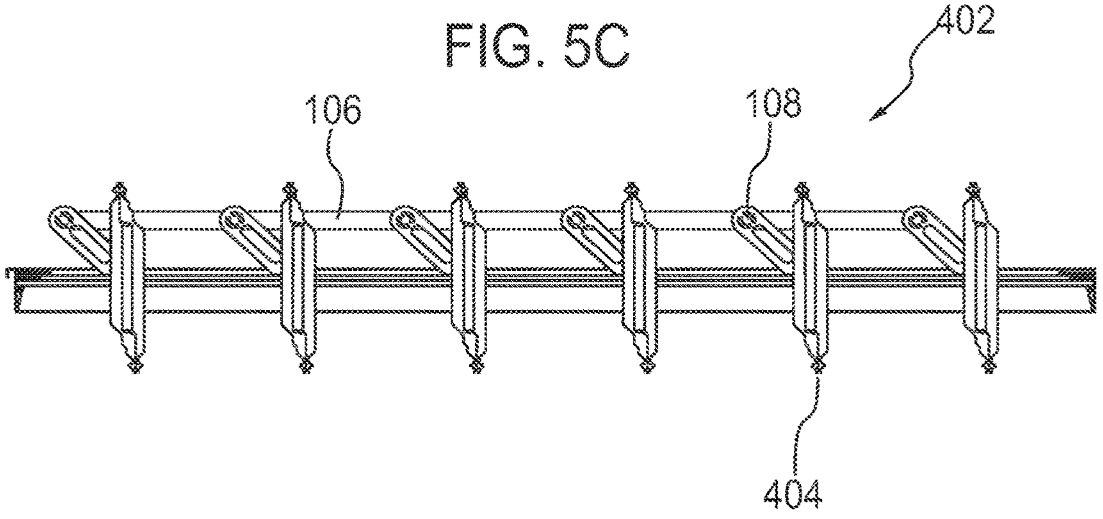

FIGS. 5A-C show side elevations of differing sized louvres 104, 404 for a ceiling panel 102, 402 in the open configuration. In the embodiment in FIG. 5A, louvres 104 with louvre width 37 mm, thickness 12 mm and louvre pitch 37 mm are disposed along the ceiling panel 102. When in the open configuration, these louvres achieve a 67.0% open area. FIG. 5B shows a different embodiment with louvres 104 having a louvre width 425 mm, thickness 12 mm and louvre pitch 425 mm disposed along the ceiling panel 102. When in the open configuration, these louvres achieve a 97% open area. The larger louvres achieve a greater specified percentage open area, but they extend into the space of the pod room and reduce the useable space inside.

FIG. 5C shows a preferred embodiment with louvres 404 having a louvre width 248 mm, thickness 40 mm and louvre pitch 207.5 mm, disposed along the ceiling panel 402. When in the open configuration, these louvres 404 achieve a 72% open area.

Figure 6A:
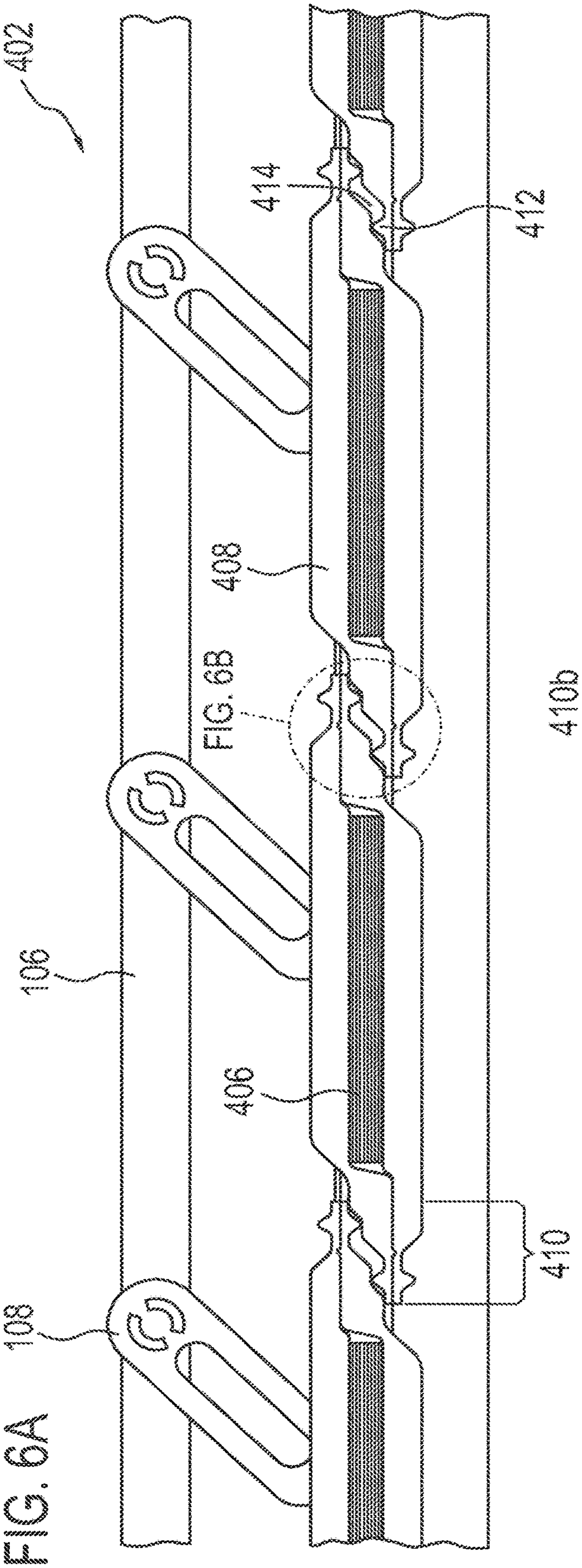
FIG. 6A is a partial side elevation showing several cover components in the closed configuration. Inset
Figure 6B:
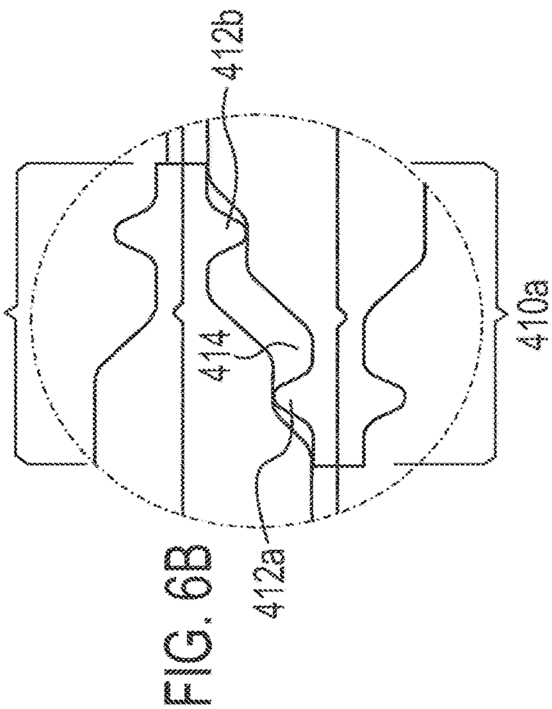
FIG. 6B shows a detail of the overlapping portion of two neighbouring cover components.

FIG. 6A shows a partial side elevation view of a preferred embodiment of a ceiling panel 402 in the closed configuration. Ceiling panel 402 contains composite louvres 404 comprising planar higher density material cores 406 and lower density material cladding 408 disposed around the planar cores 406. Either of the higher density or the lower density materials may comprise sound absorbent material having a fractional absorption coefficient of 0.6 or more. Furthermore, either one of the higher density or the lower density materials may comprise a sound insulating material. The overlapping portions or flanges 410 of two adjacent louvres comprise the lower density material and are configured to improve the acoustic seal in the closed configuration. A nib 412 may protrude substantially perpendicularly to the flange 410 of louvre 404 and defines, alongside the overlapping portion or flange 410 of a neighbouring louvre 404, an acoustically insulating cavity 414 between the louvres 404. As is shown more clearly in the inset FIG. 6B, the nib 412*a* positioned on overlapping portion or flange 410*a* may directly abut the overlapping portion or flange 410*b* of the neighbouring louvre. Corresponding nib 412*b* positioned on overlapping portion or flange 410*b* may directly abut the overlapping portion or flange 410*a*. Together the overlapping portions and nibs define acoustic insulating cavity 414. The acoustically insulating cavity 414 increases the number of reflections of an energy wave (such as sound wave), reducing the intensity of the energy wave which passes through the ceiling panel 402.

FIGS. 7A and 7B show the actuation mechanism 103 connecting to the bar 106 by means of a rotating actuator arm 114 fixed to the actuation mechanism 103 locating into a slot 112 of the lever arm 108 and thereby to all the louvres 104 by means of the bar 106.

The ceiling system 100 further comprises an optional detection unit configured to respond to the detection of a predetermined condition by cutting power to an actuation mechanism of one or more of the ceiling panels 102, causing the actuation mechanism to enter the unpowered state, and allowing the spring release to move the louvres 104 to the open configuration.

Figure 8:
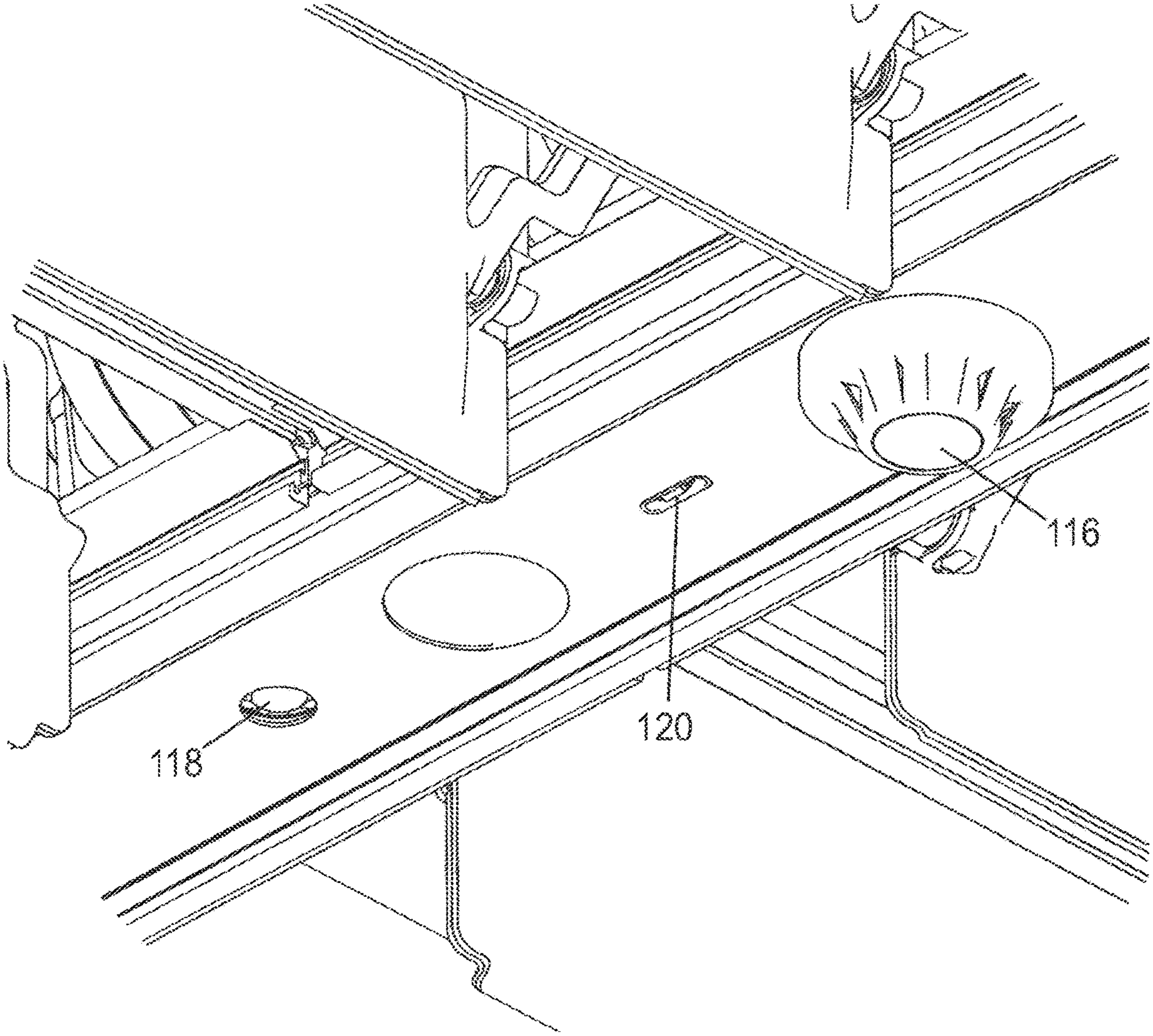
FIG. 8 shows detection units of the ceiling system of FIGS. 1-7.

Referring to FIG. 8, in one example, the detection unit comprises a smoke detector 116 configured to respond to the detection of smoke. In another example, the detection unit comprises a movement detector 118 configured to respond to the detection of an absence of movement in the pod room 10. In a further example, the detection unit comprises a heat detector configured to respond to the detection of a temperature within the pod room 10 reaching a predetermined threshold. One example of a heat detector comprises a fusible link 120 configured to fuse and thereby cut power to the said actuation mechanism when the temperature within the pod room reaches the predetermined threshold. It should be understood that, although FIG. 8 for illustration purposes shows three different detection units, the ceiling system 100 may comprise any number of detection units of any type, or no detection unit at all.

In use, the louvres 104 may be opened, for example in the event of a fire, in a number of different ways:—

1. By the smoke detector 116 wired in such a way as to cut power to the actuation mechanism 103, thereby allowing the spring release to open the louvres 104.
2. In the event of a power cut, the spring release will automatically open the louvres 104, as the actuation mechanism 103 is connected to the power in the pod room 10. In this case, there is no need for a detection unit.
3. When the movement detector 118 senses no movement of people in the pod room 10, the movement detector 118 cuts the power and the louvres 104 will automatically be opened by means of the spring release.
4. In the event of no smoke, the heat detector fusible link 120 may cut power to the pod room 10 at a predetermined threshold temperature, which in one example may be around 68 to 73° C. The heat detector fusible link 120 may also be used without a smoke detector.
5. In the event of an electrical equipment failure fusing the systems and cutting the power.
6. If the smoke detector fails or is removed, the power is cut.

All the above work by cutting power to the actuation mechanism 103 allowing the louvres 104 to open by means of the spring release.

Figure 9:
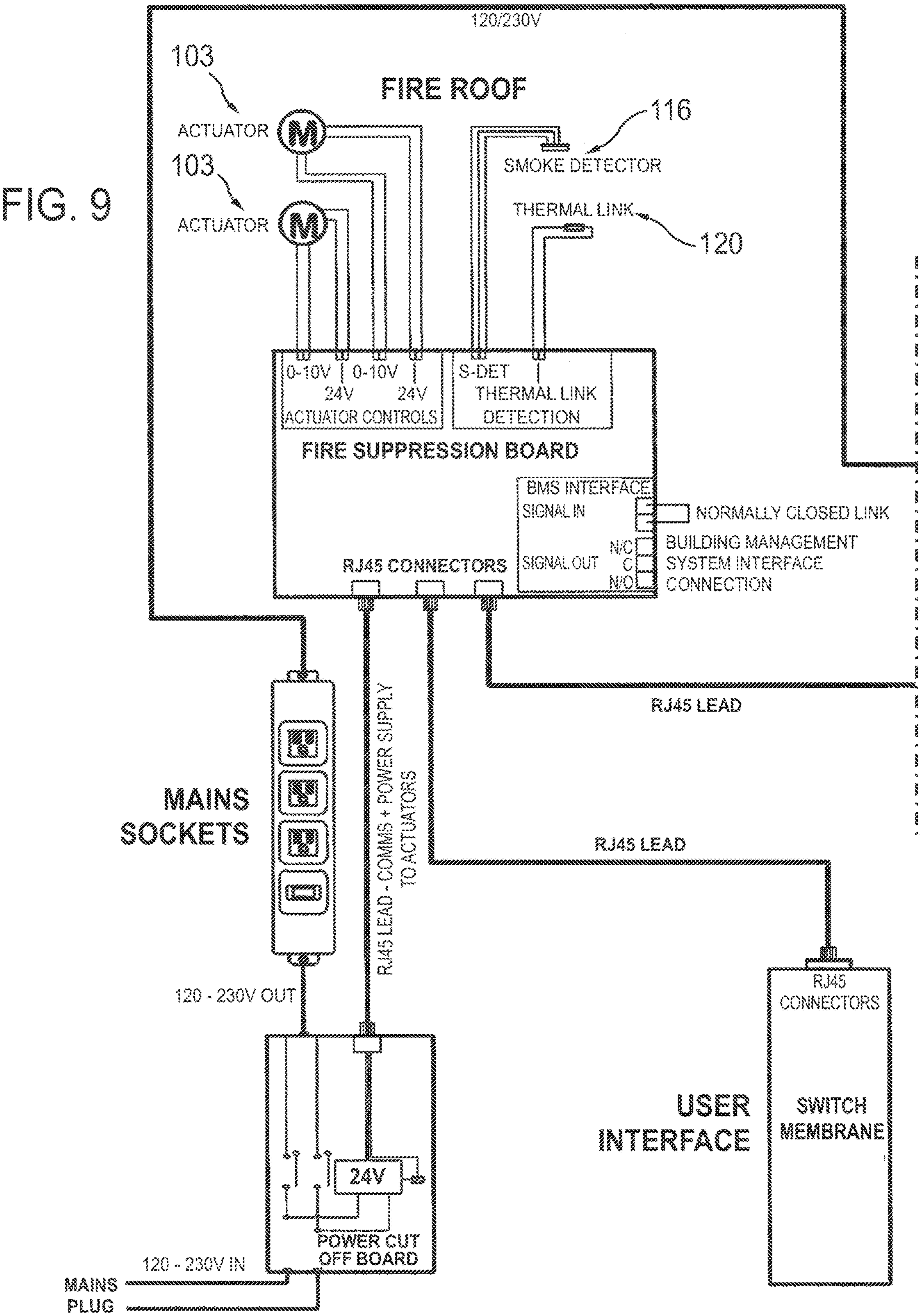
FIG. 9 shows control circuitry.
Figure 10B:
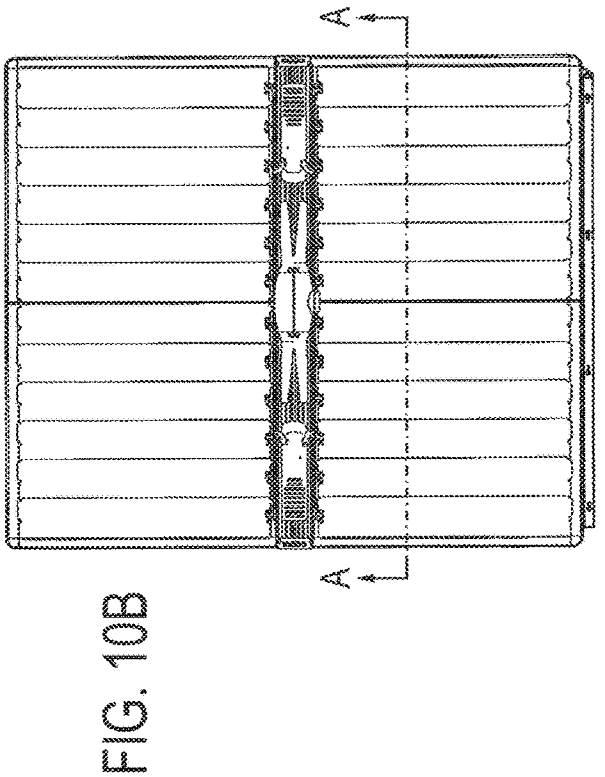
FIGS. 10A, 10B and 10C show a square pod room having a ceiling system in a closed configuration.
Figure 10A:
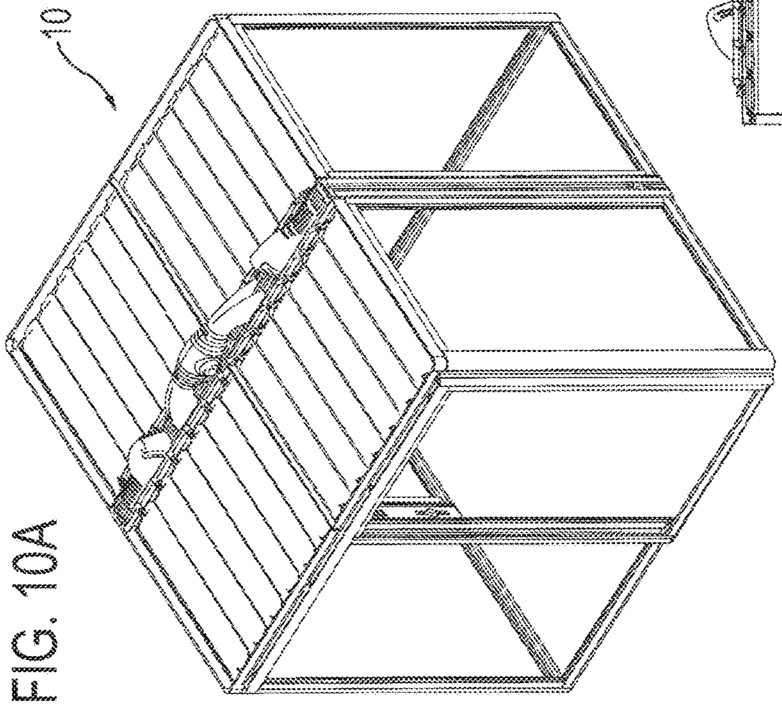
Figure 10C:
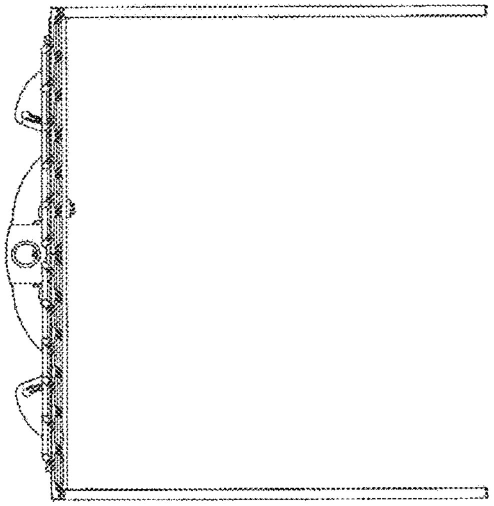
Figure 11A:
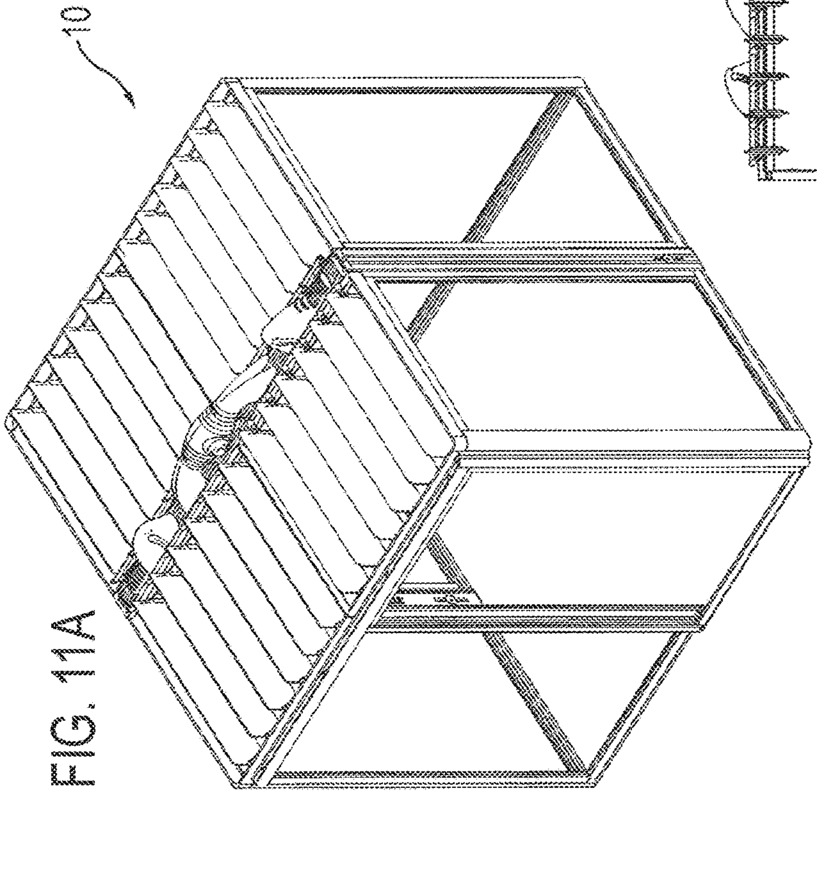
FIGS. 11A, 11B and 11C show the pod room of FIG. 10 with the ceiling system in an open configuration.
Figure 11B:
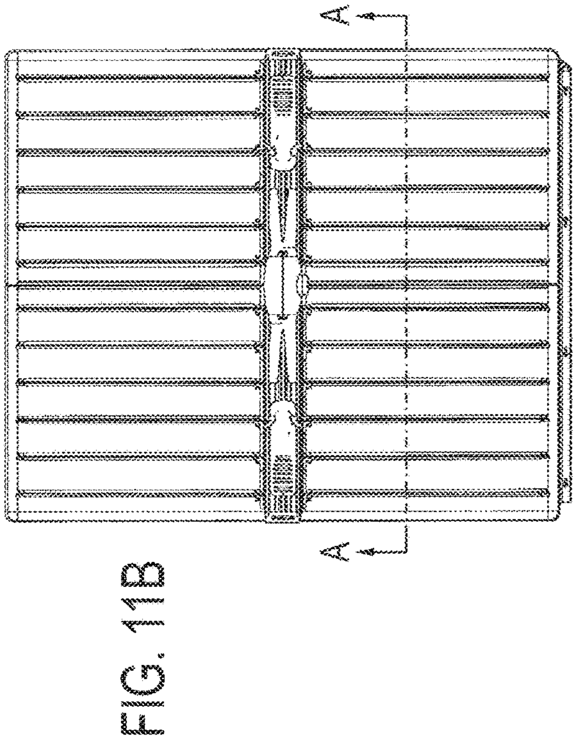
Figure 11C:
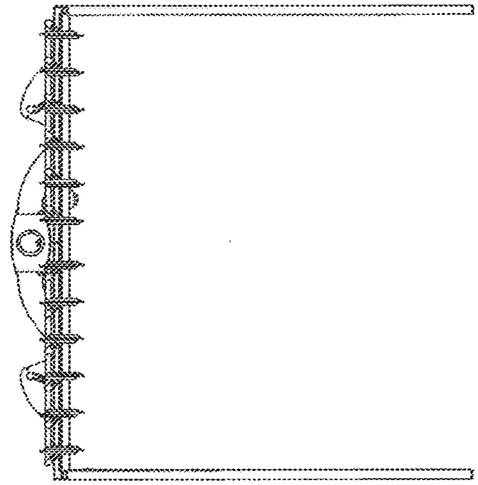
Figure 13A:
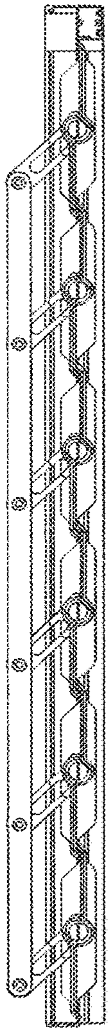
FIGS. 13A and 13B are side elevations of the ceiling panel of FIGS. 12A and 12B respectively in closed and open configurations.
Figure 13B:
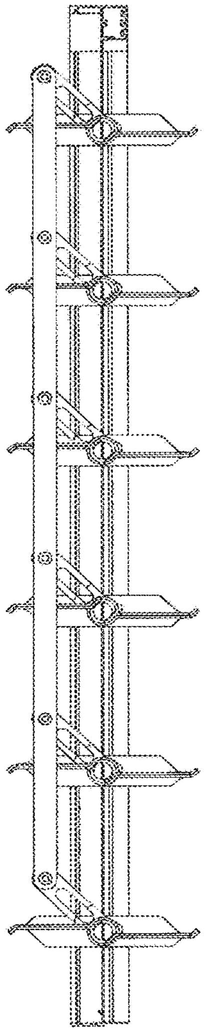
Figure 12A:
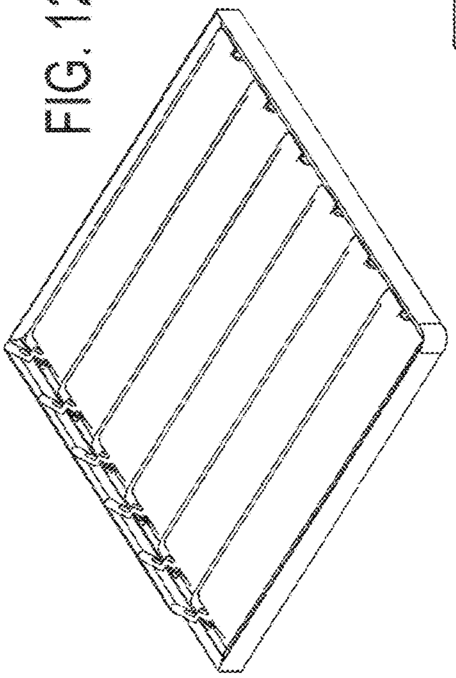
FIG. 12A shows a single ceiling panel in a closed configuration.
Figure 12B:
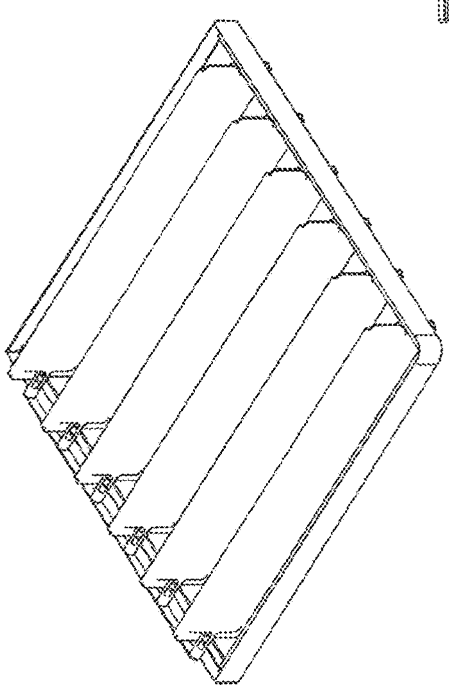
FIG. 12B shows the ceiling panel of FIG. 12A in an open configuration.

FIG. 9 shows circuitry which is designed and programmed to link all the electrical equipment and sensors together within the pod room 10 to enable automatic opening through cutting the power of the roof in the event of a fire or closing of the roof when the PIR 118 senses movement of people entering the pod for a meeting or for work.

In the open configuration, the ceiling system 100 enables the heat from a fire inside the pod room 10 to be released as quickly as possible, which may allow a sprinkler head to be activated. Once the sprinkler head has activated, the open configuration of the louvres 104 allows enough water to ingress into the pod room 10 to control the fire.

The louvres 104 may be designed with fire rated board, foam and fabric and the combination may be designed to have an acoustic performance level of absorption, insulation and diffusion by means of a specific density of integral board, outer acoustic performance foam and the pattern on each louvre 104.

Although not shown, the louvres 104 may be designed to overlap the edges of the frame 110 to generate an acoustic seal and minimise any gaps.

FIGS. 10A-C, 11A-C, 12A-B and 13A-B show a pod room 10 which differs from that described above in that the pod room 10 is a square pod rather than a round pod.

Figure 14B:
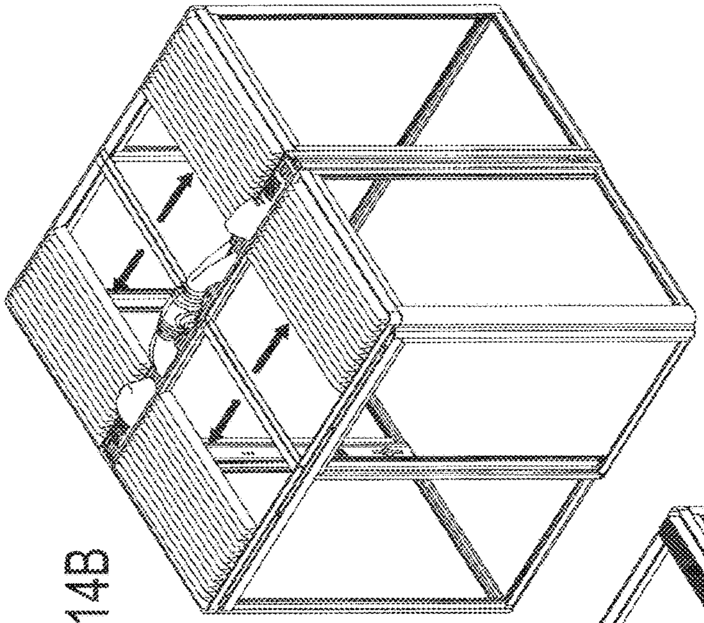
FIGS. 14A, 14B and 14C illustrate a ceiling system respectively in closed, partially-open and fully open configurations.
Figure 14C:
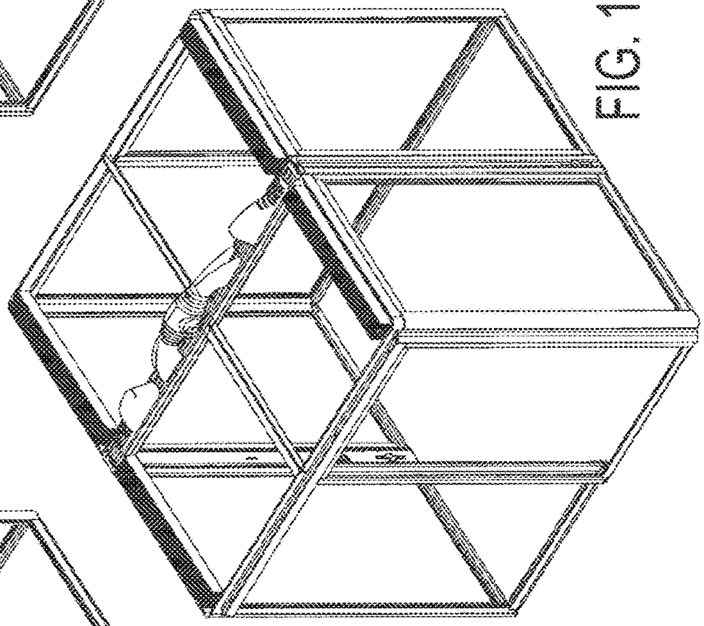
Figure 14A:
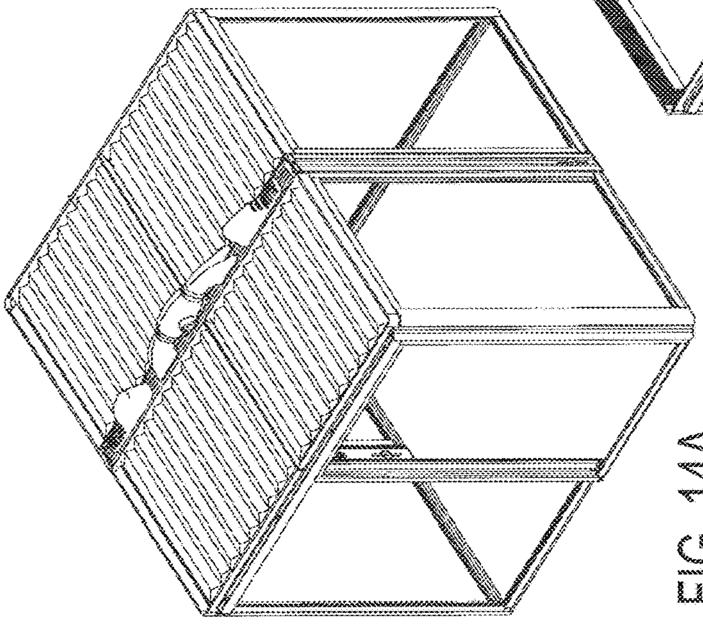
Figure 15B:
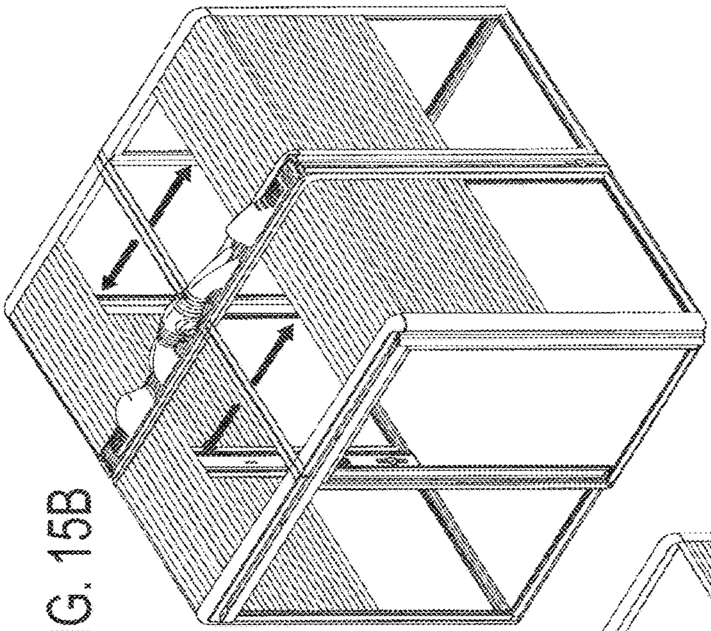
FIGS. 15A, 15B and 15C illustrate a ceiling system respectively in closed, partially-open and fully open configurations
Figure 15C:
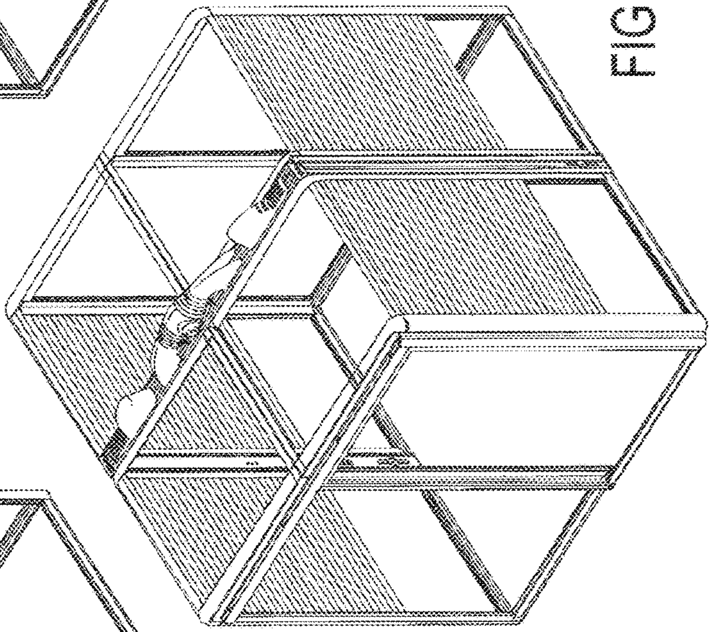
Figure 15A:
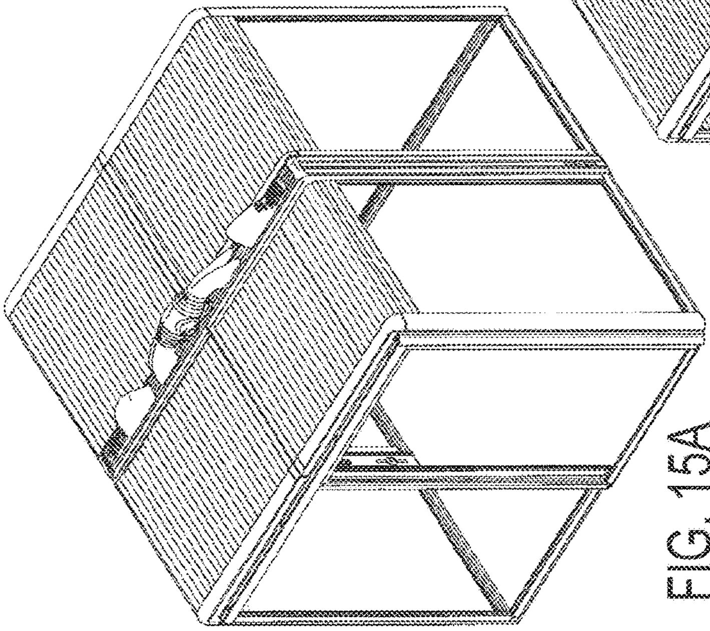

Variants include a ceiling system 200 as shown in FIGS. 14A-C having flexible concertina type retracting roof material driven by an actuator to draw the roof open to one side, and a ceiling system 300 as shown in FIGS. 15A-C having a retracting tambour door type construction driven by an actuator and rolling across and down the sides of the pod room. These variants may generate a 70% open area.

Figure 16A:
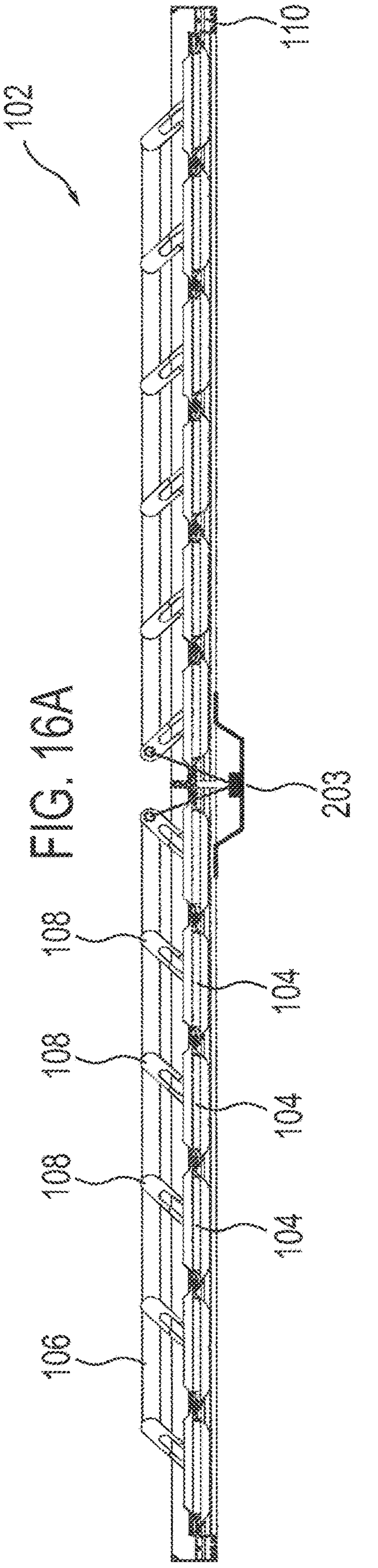
FIGS. 16A and 16B illustrate an actuation mechanism of a ceiling panel respectively in closed and open configurations.
Figure 16B:
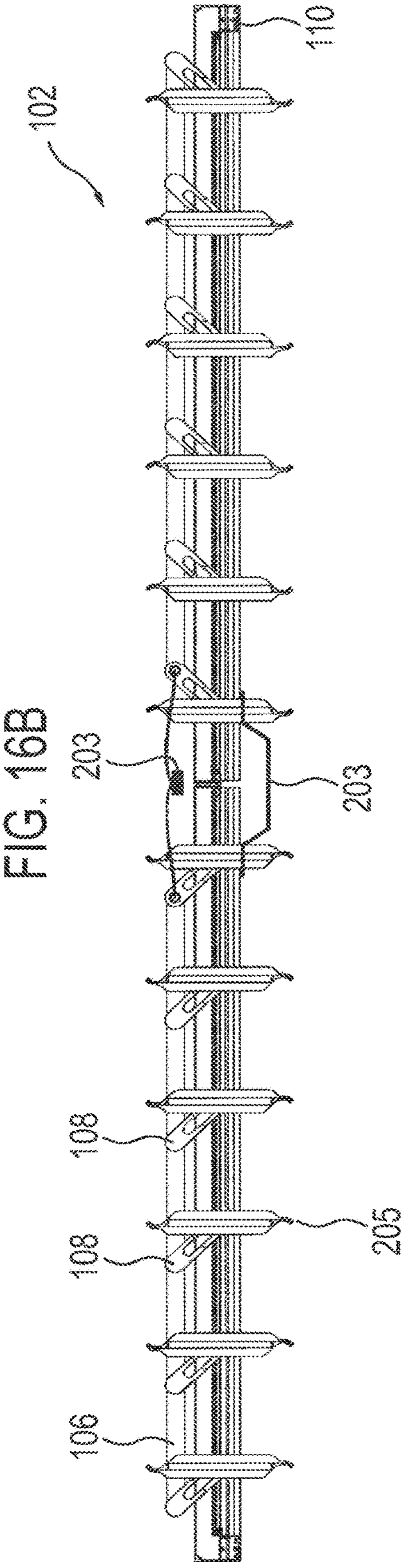

FIGS. 16A and 16B show an actuation mechanism in which the louvres 104 are biased towards the open configuration by a counterweight 205 or spring attached to one side of each louvre 104. The louvres 104 are held in the closed configuration by a fusible link 203, which is configured to fuse at a predetermined threshold temperature, which in this case is 73° C. The fusible link 203 connects one pivoting arm of one set of louvres 104 to another pivoting arm 108 in a second set of louvres 104, each set of louvres 104 being united by a connection bar 106 and being biased to rotate in the opposite direction to the other set. As shown, the fusible link 205 link connects one connection bar 106 to the other in the closed configuration, such that fusing of the fusible link 203 breaks the link between the connection bars 106 and frees the counterweights 205 or spring to move the louvres 104 towards the open configuration.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A pod room comprising:

a ceiling panel, the ceiling panel comprising:

a frame; and one or more cover components movable relative to the frame between an open configuration and a closed configuration and wherein in the closed configuration, the pod room comprises an acoustically insulated, self-contained room, wherein, together with the frame, the one or more cover components in a fully open configuration define at least a 70% open area through the ceiling panel, wherein the one or more cover components comprise a plurality of pivotable, self-supporting louvres which are fixed at intervals relative to one another, each louvre being configured to pivot about its central axis between a contacting position in which the louvres contact one another to define the closed configuration, and a non-contacting position which defines the open configuration, wherein the central axis is located within a body of the louvre; and an actuation mechanism configured to automatically move the one or more cover components from the closed configuration to the fully open configuration in response to a trigger.

2. The pod room of claim 1, wherein the ceiling panel further comprises a connection element pivotably connected to each louvre to effect synchronous movement of the louvres.

3. The pod room of claim 1, wherein the louvres comprise any one or more of fire-rated board, foam or fabric.

4. The pod room of claim 1, wherein the cover components comprise a composite of a higher density material and a lower density material.

5. The pod room of claim 4, wherein the higher density material forms a core and the lower density material forms a cladding around at least a portion of the higher density material.

6. The pod room of claim 5, wherein the core is substantially planar.

7. The pod room of claim 6, wherein the cladding extends around the core.

8. The pod room of claim 6, wherein the cladding further comprises a flange.

9. The pod room of claim 4, wherein the higher density material has a density of at least 500 kg/m$^3$.

10. The pod room of claim 4, wherein at least one of the higher density material and the lower density material comprises a sound insulating material.

11. The pod room of claim 4, wherein at least one of the higher density material and the lower density material comprises a sound absorbent material.

12. The pod room of claim 11, wherein the absorbent material has a fractional absorption coefficient of at least 0.6.

13. The pod room of claim 11, wherein the absorbent material has a thickness of between 5 mm and 25 mm.

14. The pod room of claim 11, wherein the absorbent material has a thickness of about 15 mm.

15. The pod room of claim 1, wherein the louvres have a louvre pitch of between 30 mm and 500 mm.

16. The pod room of claim 1, wherein the louvres have a louvre pitch of between 150 and 250 mm.

17. The pod room of claim 1, wherein the louvres have a louvre thickness of between 6 mm and 70 mm.

18. The pod room of claim 1, wherein the louvres have a louvre thickness of between 25 mm and 50 mm.

19. The pod room of claim 1, wherein the actuation mechanism is further configured to move the one or more cover components towards the closed configuration when a passive infrared sensor senses movement of people entering the pod room.

20. The pod room of claim 1, further comprising a detection unit configured to provide the trigger to the actuation mechanism in response to detection of a predetermined condition, wherein the predetermined condition comprises a failure of the detection unit or removal of the detection unit.

* * * * *